J. SCHAFHAUS.
Mash-Machine for Brewers.
No. 161,708.
Patented April 6, 1875.
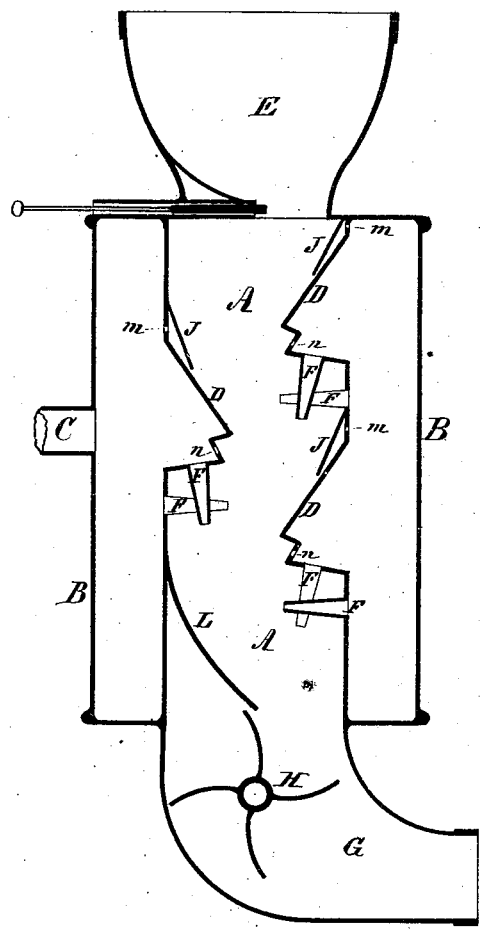
Witnesses
James P. Hyde
John F. Allen
Inventor
John Schafhaus
per Henry & Roeder
Attorney

UNITED STATES PATENT OFFICE.

JOHN SCHAFHAUS, OF NEW YORK, N. Y.

IMPROVEMENT IN MASH-MACHINES FOR BREWERS.

Specification forming part of Letters Patent No. 161,708, dated April 6, 1875; application filed October 1, 1874.

*To all whom it may concern:*

Be it known that I, JOHN SCHAFHAUS, of New York, in the State of New York, have invented a new and useful Improvement in Mash-Machines for Brewers, of which the following is a specification:

This invention is an improvement of the machine described and patented by me on March 10, 1874; and consists in the arrangement of a series of holes covered by a plate extending the whole width of the inner chamber, terminating close upon the inclined ridges or surfaces, in such a manner that a continuous flat stream of water is made to pass over these surfaces to wash the same perfectly clean, and prevent the lodgment or accumulation of any substance thereon, whereby acidity might be produced or generated; and, further, in the arrangement of a wheel, turning freely on its axis, in the spout or passage below the chamber, upon which the mash falls, turning thereby said wheel, and assisting in the further operation of perfect mashing.

In the accompanying drawing, which represents a section of a mash machine embodying my improvements, A represents the inner and B the outer chamber, between which the water used in the mashing process is introduced through the pipe C. D are inclined projecting surfaces in the interior of the chamber A, arranged alternately on the opposite sides, below each other, so that the material to be mashed and introduced through the hopper E will fall from one upon the other, being met in its passage by streams of water running through the pipes F and holes $n$. Near the top of these inclined surfaces holes $m$ are made, covered by an inclined plate, J, running downward till within a short distance of the surface D, so as to leave a small longitudinal opening extending the whole width of said surface D, whereby a flat, continuous stream of water is made to run over this surface D, preventing thereby any lodgment of particles upon said surfaces, whereby acidity might be generated. In the passage or channel G, leading from the inner chamber A to any desired reservoir to collect the mash, a wheel, H, is arranged close to the under side of the chamber A, and a suitable guiding-plate, L, is attached to the inside of the chamber, conducting the mash upon either one or the other side of said wheel H, as may be desired, and whereby this wheel H is made to turn, irritating thereby the mash, and assisting in the process of mashing.

What I claim as my invention, and desire to secure by Letters Patent, is—

1. The holes or openings $m$ at the upper part of the surfaces D, in combination with the plate J, arranged in relation with the projecting surfaces D in a mash-machine, substantially as and for the purpose set forth.

2. In a mash-machine, constructed substantially as herein described, the self-turning wheel H, in combination with the guiding-plate L, arranged and operating in the manner and for the purpose specified.

JOHN SCHAFHAUS.

Witnesses:
HENRY E. ROEDER,
JOHN F. ALLEN.